: 2,795,620
Patented June 11, 1957

2,795,620

RECOVERY OF 3-CHLORONITROBENZENE

Albert Bloom, Summit, and David E. Graham, Winfield, N. J., assignors to General Aniline & Film Corporation, New York, N. Y., a corporation of Delaware No Drawing. Application December 30, 1953, Serial No. 401,371

8 Claims. (Cl. 260—646)

This invention relates to the separation of chloronitrobenzenes and more particularly to the separation of 2- and 4-chloronitrobenzenes from a mixture comprising 2-, 3- and 4-chloronitrobenzenes and to the recovery of pure 3-chloronitrobenzene.

In accordance with the known methods for the manufacture of 3-chloronitrobenzene, as exemplified by the process published in B. I. O. S. 986, page 101, the following operations are involved:

(1) Chlorination of nitrobenzenes with sufficient chlorine to produce a crude chlorination mixture containing unchlorinated nitrobenzene, 3-chloronitrobenzene, isomeric mono (2-, and 4-) chloronitrobenzenes and dichloronitrobenzenes, the 3-chloronitrobenzene being the major and desired constituent.

(2) Fractional distillation of the crude chlorination mixture to produce a crude 3-chloronitrobenzene distillate fraction (after a forerun to remove unchlorinated nitrobenzene) and a still residue containing 2-, and 4-chloronitrobenzenes, 2,5-dichloronitrobenzene, isomeric dichloronitrobenzenes and a small amount of 3-chloronitrobenzene, the largest constituent being the 2,5-dichloronitrobenzene.

(3) Fractional freezing or "sweating" of the crude 3-chloronitrobenzene distillate fraction at temperatures up to about 40° C. to obtain a pure 3-chloronitrobenzene residue and drip oils comprising a major proportion of 3-chloronitrobenzene and the balance of isomeric mono chloronitrobenzenes.

In the fractional distillation operation, an efficient column (20 to 30 or more theoretical plates) must be used to separate the crude 3-chloronitrobenzene from its impurities which would, if carried through, drastically lower the yield of pure compounds. In addition, the eutectic mixtures obtained as drip oil by-products from the fractional freezing operation are extremely difficult to separate by fractional distillation. In order to obtain a product of a higher degree of purity, it is accordingly necessary to use elaborate and expensive distillation and freezing equipment.

It is an object of this invention to provide methods for producing a pure 3-chloronitrobenzene in higher yields and/or which do not require the use of an expensive fractionating column and/or expensive fractional freezing equipment. Other objects and advantages of this invention will appear as the description proceeds.

The attainment of the above objects is made possible by our discovery that when mixtures containing nitrobenzene and isomeric mono- and dichloronitrobenzenes are subjected to sulfonation with oleum, the nitrobenzene and the 2- and 4-chloronitrobenzenes are preferentially sulfonated, which water-soluble sulfonated compounds are easily separated from the mixtures by treatment with water. The fact that 2-chloronitrobenzene and 4-chloronitrobenzene are preferentially sulfonated under the conditions involved was indeed surprising and unexpected. According to Fischer, Ber. 24, 3185 (1895), when a mixture of 2-chloronitrobenzene and 4-chloronitrobenzene is sulfonated, the 2-chloronitrobenzene is sulfonated while the 4-chloronitrobenzene is unchanged, whereby the two compounds are stated to be easily separable. According to U. S. Patent No. 1,759,554, when a mixture of 3-chloro-2-methyl-nitrobenzene and 3-chloro-6-methyl-nitrobenzene is subjected to sulfonation, the 3-chloro-2-methyl-nitrobenzene is sulfonated whereby it is easily separated with water from the unsulfonated 3-chloro-6-methyl-nitrobenzene. It was accordingly quite surprising to find that, contrary to the implications and teachings of the aforementioned references, when mixtures containing 2-chloronitrobenzene, 3-chloronitrobenzene, 4-chloronitrobenzene and isomeric dichloronitrobenzenes are subjected to sulfonation, the 2-chloronitrobenzene and 4-chloronitrobenzene are preferentially sulfonated while the 3-chloronitrobenzene remains unsulfonated, whereby their separation is easily achieved by means of treatment with water.

Stated broadly, the instant invention comprises a process for separating 2- and 4-chloronitrobenzenes from a mixture comprising 2-, 3- and 4-chloronitrobenzenes comprising subjecting said mixture to sulfonation with oleum and then separating the water-soluble sulfonated 2- and 4-chloronitrobenzenes from the unsulfonated 3-chloronitrobenzene by treating the mixture with water. More particularly, in accordance with this invention, nitrobenzene is chlorinated in accordance with the aforementioned known process, the resulting crude chlorination mixture of nitrobenzene and chlorinated nitrobenzenes is subjected to sulfonation with oleum, and the water-soluble sulfonated nitrobenzene and 2- and 4-chloronitrobenzenes then separated from the unsulfonated constituents in the mixture by treating the mixture with water. The treatment with water may be conducted in a well known manner as for example by dilution with water followed by separation by decantation, siphonation or equivalent, washing with water, and the like.

From the above, it will become apparent that another unexpected advantage of this invention is that the unchlorinated nitrobenzene is removed with the 2- and 4-chloronitrobenzenes, thereby avoiding the necessity of a forerun, in the subsequent fractional distillation, for the purpose of removing the unchlorinated nitrobenzene.

The sulfonation in accordance with the instant invention is conducted in a well known manner by means of oleum of from 1 to 30 percent or more strength (free $SO_3$). The temperatures maintained during sulfonation may range from about 40 to 120° C. although temperatures of from 70 to 95° C. are preferred. The weight ratio of the oleum to the mixture containing the chlorinated nitrobenzenes will of course vary in accordance with the concentration of oleum employed and the proportion of 2-, and 4-chloronitrobenzenes and nitrobenzene contained in the mixture and may range from about 0.5:1 to 10:1. The duration of the sulfonation will of course be dependent upon the particular proportions, concentrations and temperatures involved.

Following the separation of the sulfonated nitrobenzene and 2- and 4-chloronitrobenzenes, the residual unsulfonated crude 3-chloronitrobenzene mixture may be subjected to fractional freezing at temperatures up to about 40° C. to yield a residue comprising substantially pure 3-chloronitrobenzene.

In carrying out the fractional freezing operation, the mixture must be cooled to a temperature below its solidification point, the lower limit being preferably determined by the temperature at which the eutectic mixture freezes. The upper temperature limit of the fractional freezing operation should be just below the solidification point of the compound being purified, which is 44° C. for C. P. 3-chloronitrobenzene. Instead of or in addition to the fractional freezing step, the residual unsulfonated crude 3-chloronitrobenzene mixture may be subjected to a fractional distillation through a column containing relatively few theoretical plates to obtain a high yield of substantially pure 3-chloronitrobenzene. The following examples, in which parts are by weight unless otherwise indicated, are illustrative of preferred embodiments of the invention and are not to be regarded as limitative.

Example 1

(a) 200 parts of a crude chlorination mixture containing 12% of nitrobenzene, 60% of 3-chloronitrobenzene, 10% of 2- and 4-chloronitrobenzenes and 18% of dichloronitrobenzenes, having a specific gravity of about 1.36 at 20° C. and produced by chlorinating nitrobenzene as disclosed in B. I. O. S. 986, page 101, are dropped into 520 parts of fuming sulfuric acid containing 10% free $SO_3$. The solution is heated to 85° C. and held there for 4 hours. It is diluted with water and the oil which separates is washed with warm water to remove acid and the sulfonated impurities, then dried. There is obtained 159 parts (79.5% of the charge) of oil (crude 3-chloronitrobenzene) of S. P. (solidification point) 30.5° C.

(b) 258.8 parts of the oil product of (a) above is cooled slowly to a temperature of about 20° C. in a vertical tubular "sweating" apparatus (see B. I. O. S. 986, page 101 for general description of apparatus). The tube is drained at the bottom and allowed to drain further while slowly raising the tube temperature to about 40° C. at a rate of about 1°/hr. The residual product is melted and drained out separately to give 98 parts (37.9% of charge) of 3-chloronitrobenzene of S. P. 42.0° C. and purity 95%.

The overall yield of 3-chloronitrobenzene for the two steps (a) and (b) is 29.9% from crude or 47.5% of theoretical.

Example 2

1200 parts of the oil product of Example 1(a) are fractionally distilled in vacuo in a glass helix packed column of 1" I. D. and 4 ft. height having about 9 theoretical plate efficiency. 855 parts (71% of charge) of 3-chloronitrobenzene of S. P. 43° C. and of 97% purity is obtained. The overall yield of 3-chloronitrobenzene for the two steps in 56% from crude or 93.5% of theoretical.

Example 3

(a) 800 parts of a crude chlorination mixture as described in Example 1(a) are dropped into 585 parts of fuming sulfuric acid containing 20% free $SO_3$. The solution is then heated for 2 hours at 70° C. and 4 hours at 85° C., after which it is diluted with water and the oil which separates washed with warm water and dried. There is obtained 656 parts (82.0% of charge) of oil of S. P. 30.9° C.

(b) 258.8 parts of the oil product of (a) above is subjected to the fractional freezing process described in Example 1(b). The yield of 3-chloronitrobenzene is the same, 37.9% of charge. The overall yield for the two steps (a) and (b) herein is 31.2% from crude or 49.0% of theoretical.

Example 4

1200 parts of the oil product of Example 3(a) are subjected to a fractional distillation as described in Example 2. The yield of 3-chloronitrobenzene is the same, 71% of charge. The overall yield for the two steps is 57.8% from crude or 96.3% of theoretical.

The purified products of this invention are useful as intermediates in the production of improved dyestuffs, herbicides, pharmaceuticals, and the like.

While this invention has been described with respect to certain preferred embodiments thereof, various modifications and variations within the spirit and scope of this invention will be obvious to those skilled in the art. It is accordingly to be understood that such modifications and variations are included within the purview of this application and the scope of the appended claims.

We claim.

1. A process for separating nitrobenzene and 2- and 4-chloronitrobenzenes from a mixture comprising nitrobenzene and 2-, 3-, and 4-chloronitrobenzenes, comprising subjecting said mixture to treatment with oleum to preferentially sulfonate the nitrobenzene and the 2- and 4-chloronitrobenzenes and then separating the water-soluble sulfonated nitrobenzene and 2-, and 4-chloronitrobenzenes from the unsulfonated 3-chloronitrobenzene by treating the mixture with water.

2. In a process for producing chloronitrobenzene isomers comprising chlorinating nitrobenzene, the improvement comprising subjecting the resulting mixture of nitrobenzene and chlorinated nitrobenzenes to treatment with oleum to preferentially sulfonate the nitrobenzene and the 2- and 4-chloronitrobenzenes and then separating the water-soluble sulfonated nitrobenzene and 2-, and 4-chloronitrobenzenes from the unsulfonated 3-chloronitrobenzene and dichloronitrobenzenes by treating the mixture with water.

3. In a process for producing chloronitrobenzene isomers comprising chlorinating nitrobenzene, the improvement comprising subjecting the resulting mixture of nitrobenzene and chlorinated nitrobenzenes to treatment with oleum to preferentially sulfonate the nitrobenzene and the 2- and 4-chloronitrobenzenes, separating the water-soluble sulfonated nitrobenzene and 2- and 4-chloronitrobenzenes from the unsulfonated 3-chloronitrobenzene and dichloronitrobenzenes by treating the mixture with water and then subjecting the residual unsulfonated 3-chloronitrobenzene and dichloronitrobenzene mixture to fractional freezing at temperatures up to about 40° C. to yield a residue comprising substantially pure 3-chloronitrobenzene.

4. In a process for producing chloronitrobenzene isomers comprising chlorinating nitrobenzene, the improvement comprising subjecting the resulting mixture of nitrobenzene and chlorinated nitrobenzenes to treatment with oleum to preferentially sulfonate the nitrobenzene and the 2- and 4-chloronitrobenzenes, separating the water-soluble sulfonated nitrobenzene and 2- and 4-chloronitrobenzenes from the unsulfonated 3-chloronitrobenzene and dichloronitrobenzenes by treating the mixture with water and then subjecting the residual unsulfonated 3-chloronitrobenzene and dichloronitrobenzene mixture to fractional distillation to yield a distillate fraction comprising substantially pure 3-chloronitrobenzene.

5. A process as defined in claim 1 wherein said oleum contains about 10 to 20% of free $SO_3$.

6. A process as defined in claim 2 wherein said oleum contains about 10 to 20% of free $SO_3$.

7. A process as defined in claim 3 wherein said oleum contains about 10 to 20% of free $SO_3$.

8. A process as defined in claim 4 wherein said oleum contains about 10 to 20% of free $SO_3$.

References Cited in the file of this patent

UNITED STATES PATENTS

| Number | Name | Date |
|---|---|---|
| 1,759,554 | Henle et al. | Mar. 20, 1930 |
| 2,523,707 | Miller | Sept. 26, 1950 |

OTHER REFERENCES

Hickinbottom: Reactions of Organic Compounds, Longmans, Green & Co., New York, N. Y., 2nd ed. (1948); p. 60.

Lisk: Industrial and Engineering Chemistry, 41, 1923 (1949); p. 1926 relied on.

Gilbert et al.: Industrial and Engineering Chemistry, 43, 2022 (1951); pp. 2033–2034 relied on.

UNITED STATES PATENT OFFICE

CERTIFICATE OF CORRECTION

Patent No. 2,795,620                                   June 11, 1957

Albert Bloom et al.

It is hereby certified that error appears in the printed specification of the above numbered patent requiring correction and that the said Letters Patent should read as corrected below.

Column 3, line 43, for "two-steps in 56%" read -- two-steps is 56% --.

Signed and sealed this 24th day of September, 1957.

(SEAL)
Attest:
KARL H. AXLINE
Attesting Officer

ROBERT C. WATSON
Commissioner of Patents